June 3, 1952     V. C. HUNTINGTON     2,599,329

UNIVERSAL COUPLING

Filed June 26, 1947

INVENTOR,
Victor C. Huntington,
BY Walter P. Guyer
ATTORNEY.

Patented June 3, 1952

2,599,329

UNITED STATES PATENT OFFICE 2,599,329

UNIVERSAL COUPLING

Victor C. Huntington, Kenmore, N. Y.

Application June 26, 1947, Serial No. 757,114

1 Claim. (Cl. 64—31)

This invention relates to certain new and useful improvements in universal joints or couplings.

It has for its primary object to provide a simple and efficient universal joint which is so designed and constructed as to connect and transmit a partial or complete rotating motion from one member to another, whether the axes of rotation of the respective members are at an angle to each other, or off center to each other, or in alinement with each other, or there is present a combination of any or all of these conditions through a given cycle.

Another object of the invention is to provide a universal joint which is composed of few parts and which does not require the close tolerances, accurate fittings and other characteristics usually necessary in the present joints of this type.

A further object is to provide a durable and inexpensive joint of this character which is so designed as to automatically and constantly adjust the parts to compensate for ordinary wear, and which is free from looseness between parts and objectionable back lash.

Other features of the invention reside in the construction and arrangement of parts hereinafter described and particularly pointed out in the appended claim.

Figure 1:
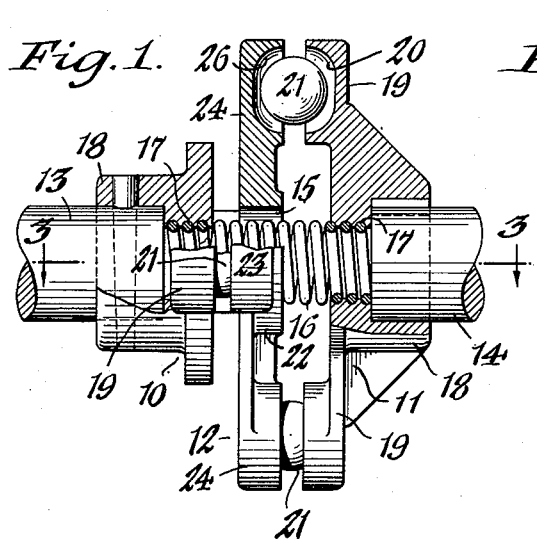
Figure 2:
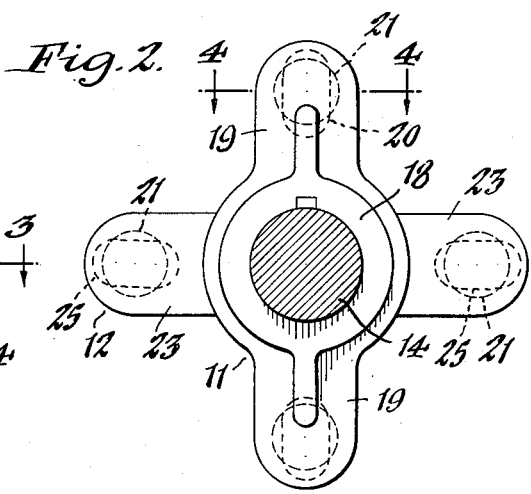
Figure 3:
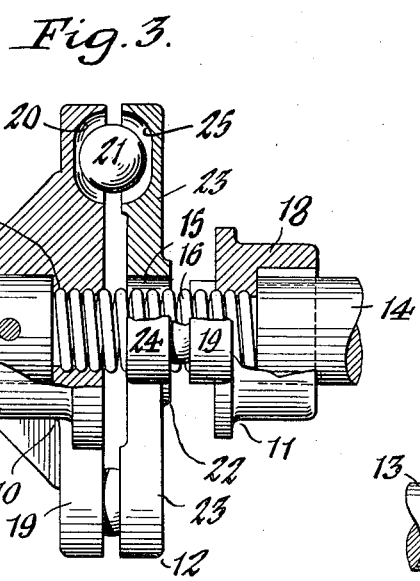
Figure 5:
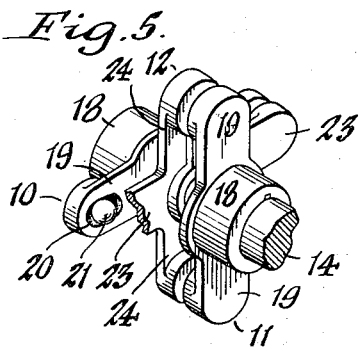
Figure 4:
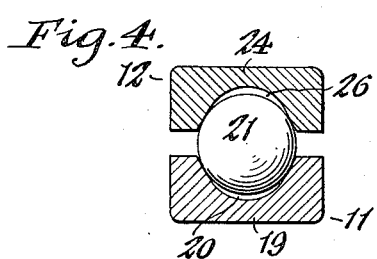
Figure 6:
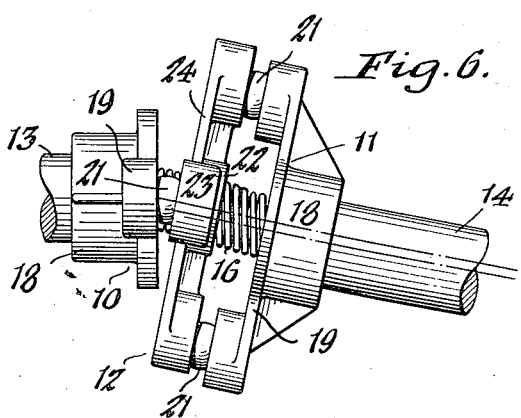

In the accompanying drawings:

Figure 1 is a sectional elevation of my improved universal joint. Figure 2 is an end view of the joint with the connecting shaft in cross section. Figure 3 is a sectional view similar to Figure 1, taken on line 3—3 of Figure 1. Figure 4 is an enlarged cross section taken on line 4—4, Figure 2. Figure 5 is a perspective view of the joint. Figure 6 is a side elevation of the joint showing the displacement of its coupling members in angular relation.

Similar characters of reference indicate corresponding parts throughout the several views.

In the preferred embodiment of my invention shown in the drawings, the same comprises three relatively connected coupling members or plates 10, 11 and 12, the end coupling member 10 being pinned or otherwise fixed on a shaft 13 and the companion end coupling member 11 being pinned or otherwise fixed on a companion shaft 14, while the intermediate coupling member 12 is free of the shafts and disposed in a plane between the end members. Axially connecting the end coupling members with each other and passing freely through a central opening 15 in the intermediate member 12 is a tension spring 16. This spring may be connected at its ends in any suitable manner to the companion coupling members 10 and 11. By way of example, the hubs of such members may be provided with thread-like openings 17 into which the opposing ends of the spring are securely threaded, as shown in Figures 1 and 3.

The end coupling members are identical in construction, each including a hub 18 and oppositely-extending or diametrically-opposed arms 19 which may be cast, stamped or otherwise formed, the arms being provided on their inner faces and adjacent the outer ends thereof with diametrically-alined elongated race-ways 20 for receiving in bearing relation thereto, and the opposing sides of the intermediate coupling member 12, the adjoining sides of companion bearing elements which are preferably in the form of balls 21. These race-ways are on a common center line intersecting the axis of the companion coupling member and they are located equidistant from the such axis. As shown in Figures 1 and 3, the arms of the companion end coupling members 10 and 11 are disposed in crossed relation or at substantially right angles to each other.

The intermediate coupling-member 12 is complemental in shape to the oppositely-positioned end coupling members 10 and 11 and for this purpose is substantially cruci-form in shape, and includes a hub 22 containing the spring-receiving opening 15 and diametrically-opposed arms 23, 24 disposed in registering relation with the companion arms 19 of the end coupling members, as clearly shown in Figures 5. Adjacent their outer ends, those arms 23 of the intermediate coupling member are provided with outwardly-facing, diametrically-alined, elongated race-ways 25 which are in opposing registering relation with the complementary race-ways 20 in the arms of the end coupling member 10 to receive the opposite sides of the companion balls 21 in bearing relation thereto, while the other set of arms 24 of such intermediate member have similar race-ways 26 in their opposite faces which are in opposing registering relation with the complementary race-ways in the arms 19 of the end coupling member 11 to accordingly receive the companion balls in bearing relation thereto.

The ball-receiving race-ways 20 in the inner faces of the end coupling members 10, 11 and the complementary race-ways 25, 26 in the opposite side faces of the intermediate coupling member 12 are such as to prevent a displacement of the balls 21 in a lateral or circumferential direction but do permit a limited radial movement of the balls therein.

The spring 16 functions to normally urge the end coupling members, as well as the intermediate member through the intervening ball and race-way connections, toward each other in such a manner that the whole assembly as effectively, and yieldingly retained as a self-contained unit and yet possessed of universal flexibility to adapt it to axial misalignments etc. In Figure 6, for example, the joined shafts are at an angle as well as displaced laterally out of line and it will be noted that the intermediate coupling member 12 and the end coupling member 11 are at an angle to the vertical while the companion end coupling 10 is vertical with the balls 21 between the latter and the intermediate member functioning as fulcrums. It will also be noted that the balls 21 between the opposite face of the intermediate member and the end member 11 have permitted the necessary lateral off-setting or displacement of these coupling members. While the spring 16 is used in most installations, it may be omitted when the coupled shafts are fixed in bearings against end-wise displacement, whereby the coupling plates 10, 11 and 12 with their interposed bearing elements 21 are held as a unit.

While the bearing elements are preferably in the form of balls, they may be of any other form and depending upon the size of the unit, the number of bearing elements may be increased.

I claim as my invention:

A universal joint, comprising end coupling members adapted for connection to opposing shafts and each including an attaching hub and diametrically-disposed arms, an intermediate fulcruming coupling member including a hub having two sets of diametrically disposed arms at substantially right angles to each other, one set of arms being adapted for registering and fulcruming relation with the companion arms of one of the end coupling members and the other set of arms for registering and fulcruming relation with the arms of the companion end coupling member, complemental radial race-ways in the inner faces of the outer portions of the end coupling member arms and in the opposing faces of the outer portions of said intermediate coupling member arms, balls guided in said races and on which said intermediate coupling member is adapted to fulcrum, the hub of the intermediate coupling member having an axial opening therein, and a tension spring connected at its ends to the hubs of the end coupling members and passing through said opening in the hub of the intermediate coupling member.

VICTOR C. HUNTINGTON.

REFERENCES CITED

The following references are of record in the file of this patent:

UNITED STATES PATENTS

| Number | Name | Date |
|---|---|---|
| 1,317,247 | Watts | Sept. 30, 1919 |
| 1,844,471 | Johnson | Feb. 9, 1932 |
| 1,862,220 | Johnson | June 7, 1932 |
| 1,907,447 | Schlitz | May 9, 1933 |
| 2,365,128 | Wahl | Dec. 12, 1944 |
| 2,480,039 | Miller, Jr. | Aug. 23, 1949 |